US006006980A

United States Patent [19]

Lacourse et al.

[11] Patent Number: 6,006,980

[45] Date of Patent: Dec. 28, 1999

[54] METHOD AND APPARATUS FOR MOUNTING CONNECTOR TO CIRCUIT BOARD

[75] Inventors: Gerard C. Lacourse, Hudson; Andrew K. Spence; Henry G. Vollmer, both of Nashua, all of N.H.

[73] Assignee: Teradyne, Inc., Boston, Mass.

[21] Appl. No.: 08/970,185

[22] Filed: Nov. 14, 1997

Related U.S. Application Data

[62] Division of application No. 08/614,289, Mar. 12, 1996, Pat. No. 5,730,630.

[51] Int. Cl.[6] .................................................... B23K 31/02

[52] U.S. Cl. .................. 228/180.21; 228/212; 228/44.7; 269/903; 29/834; 118/500

[58] Field of Search ........................... 228/180.1, 180.21, 228/212, 44.7, 6.2, 49.5; 269/903, 270, 287, 43; 118/500; 29/834

[56] References Cited

U.S. PATENT DOCUMENTS

| | | | |
|---|---|---|---|
| 3,589,591 | 6/1971 | Schwenn | 228/44.7 |
| 3,692,225 | 9/1972 | Lincoln | 228/4.1 |
| 4,303,291 | 12/1981 | Dines | 29/843 |
| 5,035,034 | 7/1991 | Cotney | 29/25.01 |
| 5,079,827 | 1/1992 | Meyer | 29/566.3 |
| 5,125,150 | 6/1992 | Meyer | 29/566.3 |

*Primary Examiner*—Samuel M. Heinrich
*Attorney, Agent, or Firm*—Edmund J. Walsh

[57] ABSTRACT

A surface mount electrical connector incorporating features to facilitate alignment of contact tails to contact pads on a printed circuit board. The contact tails are held together with a tie bar. Tabs on the tie bar are shaped to engage features on a blade of an alignment tool. The blade can be inserted into the small available on the printed circuit board, but can be easily manipulated for precise alignment of the contact tails.

9 Claims, 2 Drawing Sheets

METHOD AND APPARATUS FOR MOUNTING CONNECTOR TO CIRCUIT BOARD

This application is a division of application Ser. No. 08/614,289, filed Mar. 12, 1996, now U.S. Pat. No. 5,730,630.

This invention relates generally to electronic assemblies and more specifically to the attachment of electrical connectors to circuit boards.

Electronic systems, such as computers, are generally made with printed circuit boards. Circuits on the boards route electrical signals to many electrical components on the board. When it is necessary to route electrical signals from a board to another point off that board, an electrical connector is used.

For example, electrical connectors are used to connect several printed circuit boards to a backplane. The backplane routes electrical signals from one printed circuit board to another. Connectors are also used for other purposes, such as to connect cables to a printed circuit board The connectors can be plugged together to make a connection or unplugged to allow the printed circuit to be removed. Connectors simplify the manufacture and repair of electronic systems in comparison to the use of fixed connections, such a soldered wires.

Connectors in many types have been used and are well known. Various ways have been used to attach connectors to printed circuit boards. In each way, it is necessary that the conductors within the connector that carry the electrical signals be electrically connected to the circuit paths on the printed circuit board.

Some connectors make use of plated through holes in the printed circuit board. Each hole passes through a conductive path on the printed circuit board. The plating on the inside of the hole is conductive and makes an electrical connection with the conductive path. The conductors within the connector have tails which extend from the connector. These tails extend from the connector and are inserted into the holes.

In some connectors, the hole is filled with solder after the tail is inserted. The solder holds the connector in lace and ensures a good electrical connection. In other instances, the tails are made with springy features. These features compress as the tail is inserted into the hole, but they press against the sides of the holes. The spring force against the sides of the holes makes a good electrical and mechanical connection. Such connectors are called "press-fit" connectors.

There are some difficulties in attaching connectors to printed circuit boards using plated through holes. First, drilling and plating the holes in the printed circuit board requires steps in the manufacturing process. If no other components are attached to the printed circuit board with plated through holes, making the plated through holes just to attach a connector is undesirable. Also, there are limits on how close together the holes can be. These limits translate into limitations on the number of signals that can pass through the connector.

To address these limitations, surface mount connectors have been used. In a surface mount connector, very fine tails extend from the connector. These tails align with conductive pads on the surface of the printed circuit board and are soldered to the pads. Because the pads are part of the conductive paths on the printed circuit board, they can be simply made in the same step as those conductive traces.

The spacing between the conductive pads on the printed circuit board and also the tails extending from the connector can be very small. Pads spaced by 0.02 inches on center or smaller have been used.

To align the tails to the pads, the ends of all the tails extending from one side of the connector are held together by a tie bar. Traditionally, the tie bar is just a small strip of plastic molded over the ends of the tails. It holds the tails together and allows them to be moved as a group. In theory, the spacing between the tails is fixed by the tie bar so that when one tail is positioned above a pad, all of the tails are properly positioned above their respective pads.

In the manufacture of printed circuit boards, the step of aligning the tails to the pads is often done manually. A person looking through a microscope grasps the tie bar at its end with a pliers-like tool and pulls the tie bar until the tails are in course alignment with the pads. A tool shaed like a pointed stick is then used to adjust each lead individually, as necessary. The tails are then soldered to the contact pads. The soldering step is often automated. After soldering, the tie bar is broken off.

An alternative alignment tool is shaped as a comb. The teeth of the comb is inserted between the leads such that each tooth pushes one lead. The tool is moved side to side until the leads are in alignment. Such a tool has the draw back of obscuring the pads, making alignment difficult. It also must be removed before the soldering operation, which can sometimes be undesirable.

In some instances, the plastic tie bar does not preserve the correct spacing between all of the tails. In those instances, the human operator sometimes finds it necessary to make cuts in the tie bar so that the tails in various portions of the connector can be correctly positioned. In that case, each lead must be individually aligned.

To avoid the need for cutting the tie bar and individually positioning sections of the connector, Teradyne Connections Systems of Nashua, N.H., USA markets a surface mount connector with a metal tie bar. The connector is sold under the tradename UHD. The metal tie bar is more stable than a plastic tie bar.

However, regardless of what the tie bar is made of, it is sometimes difficult to grasp the tie bar so that it can be precisely positioned. When the connector is mounted to the printed circuit board, the tie bar is very close to the surface of the board. In addition, there are generally many other components mounted to the surface of the board in the vicinity of the connector. There is thus little room to get a tool on the tie bar in order to grasp it.

If the alignment of contact tails to contact pads on the circuit board could be simplified, both the cost and required time for manufacturing a printed circuit boards could be decreased. More accurate positioning of the connector tails could also be facilitated, thereby reducing the number of defective printed circuit boards produced.

SUMMARY OF THE INVENTION

With the foregoing background in mind, it is an object of the invention to provide a surface mount connector configured to facilitate alignment of the connector tails to contact pads on a circuit board.

It is also an object to provide a tool for use in easily positioning connector tails.

The foregoing and other objects are achieved in a surface mount connector having a tie bar joining the contact tails. The tie bar and alignment tool are designed with complementary features which interlock. The alignment tool projects above the printed circuit board, presenting a surface which can be readily grasped for easy alignment.

In a preferred embodiment, the tie bar has hook-like tabs which engage openings in the tool. The openings are formed in a thin blade section of the tool which can be positioned near the tie bar.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
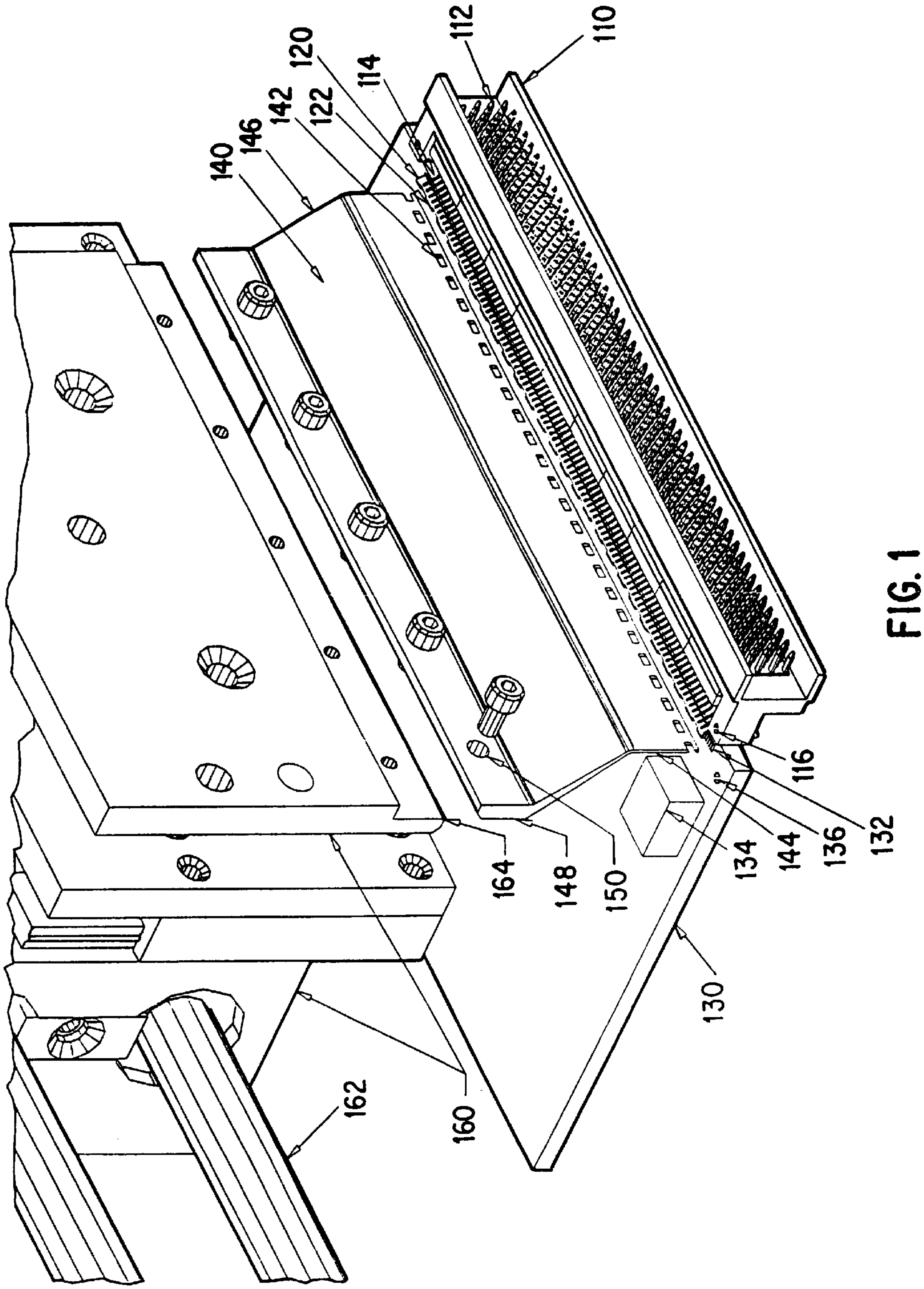
FIG. 1 shows a connector according to the invention positioned near an alignment tool and a printed circuit board.

FIG. 1 shows a surface mount connector 110. Connector 110 has numerous contact elements 112. Each contact element 112 has a tail portion 114 projecting from a rear surface of connector 110. Connector 110 is manufactured in accordance with known manufacturing techniques.

The contact tails 114 are held together at one end by tie bar 120. In a preferred embodiment, tie bar 120 is a metal tie bar. It might be soldered on to the contact tails 114 after they are formed. Alternatively, in situations where it is possible to stamp multiple contact elements 112 from the same metal blank, tie bar 120 can be formed by simply leaving a portion of the blank in the stamping operation.

Tie bar 120 includes numerous tabs 122 along its length. As will be described in greater detail below, tabs 122 facilitate positioning of contact tails 114.

Connector 110 is intended to be mounted to printed circuit board 130. Any convenient attachment means could be used. FIG. 1 shows holes 116 in connector 110 that align with holes 136 on printed circuit board 132. Attachment might be by way of a screw or rivet through holes 116 and 136.

Printed circuit board 130 includes numerous surface mounted components, with component 134 being shown as illustrative. Conductive traces (not shown) on printed circuit board 130 connect these components to contact pads 132. Contact pads 132 are preferably evenly spaced with a pitch (spacing on center) of 0.025 inches. As shown in FIG. 1, contact pads 132 are aligned along an edge (not numbered) of printed circuit board 130.

FIG. 1 shows lead alignment tool 140 used to position tails 114 relative to contact pads 132. Tool 140 has a blade portion 144 which in use is held generally perpendicular to printed circuit board 130. Blade portion 144 is relatively thin so that it might be inserted between tie bar 120 and components 134 on printed circuit board 130. In a preferred embodiment, blade portion 144 has a thickness of approximately 0.025 inches.

Blade portion 144 has a plurality of openings 142 along its lower edge (not numbered). Openings 142 have a spacing which matches the spacing of tabs 122. Openings 142 are slightly larger than tabs 122, by approximately 0.005 to 0.001 inches. Blade portion 144 may thus be positioned so that openings 142 engage tabs 122.

Figure 2:
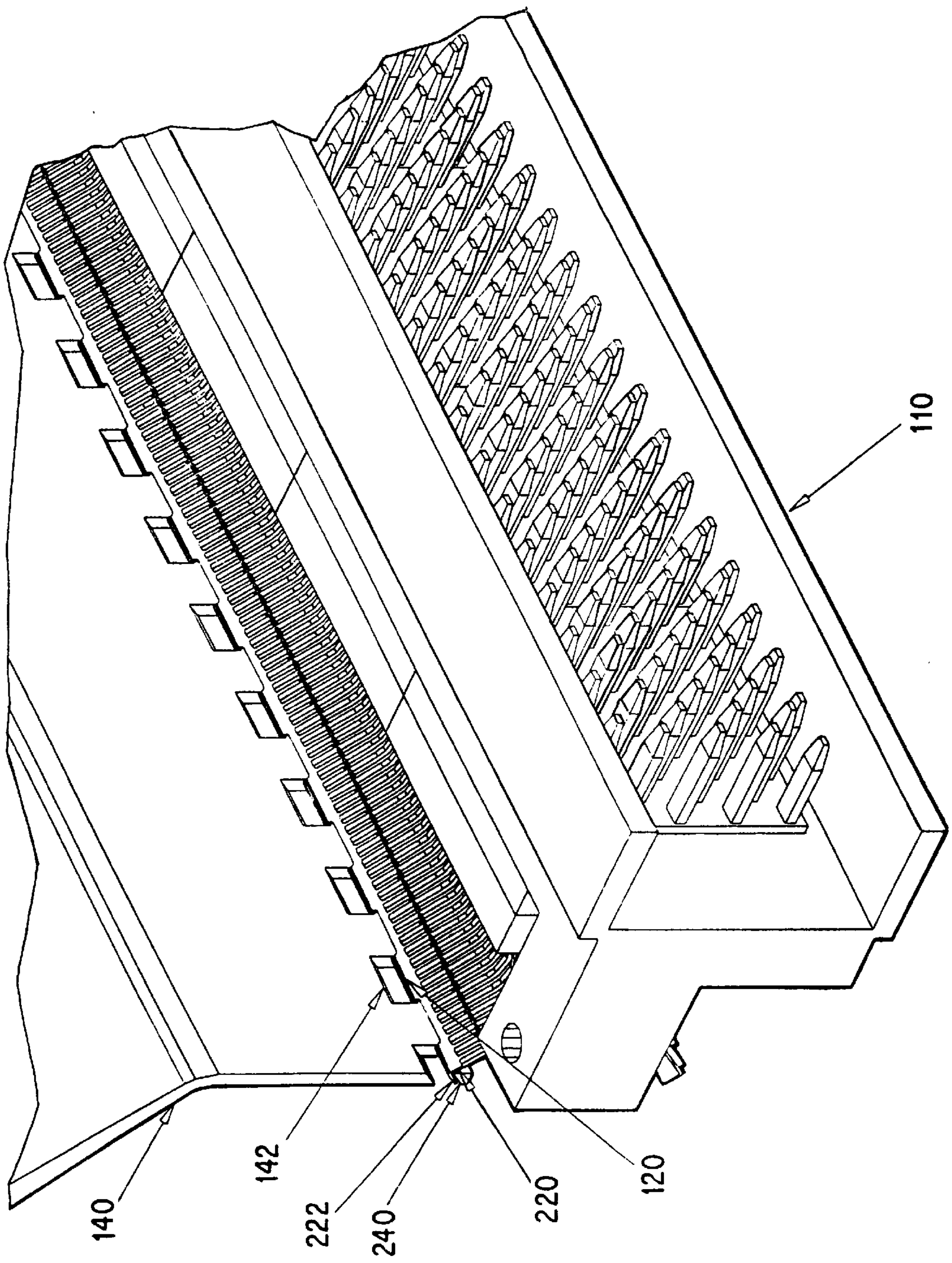
FIG. 2 shows the connector of FIG. 1 with the alignment tool engaged.

FIG. 2 shows an enlarged portion of connector 110 and alignment tool 140. Openings 142 have a lower surface 240 which is tapered. Tab 120 has two surfaces 220 and 222 which are approximately at a 90° angle. Surfaces 220 and 222 form a means for engaging the tapered surface 240. The configuration of the pieces ensures that tool 140 and tab 120 engage in a predetermined and repeatable place.

Returning to FIG. 1, alignment tool 140 has an upper portion 148 positioned well above printed circuit board 130.

Upper portion 148 is clear of the components 132 mounted to the surface of printed circuit board 130. Upper portion 148 can therefore be easily mounted to a fixture. FIG. 1 shows that upper portion 148 includes holes 150 that can be used to attach upper portion to fixture block 160.

Fixture block 160 includes a groove 164 which receives upper portion 148 to facilitate attachment of alignment tool 140 to the fixture. Fixture block 160 is movably mounted in a fixture (not shown). FIG. 1 shows that shaft 162 passes through fixture block 160.

Block 160 is mounted to shaft 162 by means of a slidable bearing (not shown) so that block 162 may be slid along shaft 162 and locked in place. Block 160 is slid in this fashion to obtain course positioning. For example, if two connectors such as connector 110 are mounted on a board 130, course positioning can be used to move between the two connectors.

Fine positioning of fixture block 160 is used for actual alignment of leads 114 to pads 132. In a preferred embodiment, shaft 162 is attached to a frame (not shown) by way of a fine pitch screw. Rotation of the screw causes transitional motion of shaft 162 along its axis. The screw (not shown) is preferably attached to a handle, motor or other means for rotating the screw (not shown).

In a preferred embodiment, shaft 162 is movably mounted in the fixture by some convenient means. Shaft 162, and therefore alignment tool 140, can move toward and away from connector 110 along a line parallel to printed circuit board 130. Shaft 162, and therefore alignment tool 140, can move toward and away from connector 110 along lines perpendicular or horizontal to printed circuit board 130. Such a movable mounting could be provided by a two axis carriage, such as is found in a pen plotter or similar device.

In use, connector 110 is attached to printed circuit board 130, such as by screws through holes 116 and 136. Board 130 is then inserted into the fixture (not shown) and affixed by any convenient means, such as clamps or spring clips.

Fixture block 160 is then moved parallel to printed circuit board 130 until blade portion 144 of alignment tool 140 is near, but slightly behind tie bar 120. Block 160 is then moved perpendicular to board 130 until openings 142 are at the same height as tabs 120. If necessary, fixture block 160 is moved along the axis of shaft 162 with course and fine motion, as described above.

Fixture block 160 is again moved towards connector 110 in a direction parallel to board 130. This motion inserts tabs 120 into openings 142.

Fixture block 160 is then moved perpendicular and away from board 130. This motion causes surfaces 220 and 222 (FIG. 2) of tab 120 to engage tapered surface 240 (FIG. 2) inside opening 142. It also causes the contact tails 114 to be lifted off the surface of printed circuit board 130.

Fine motion of fixture block 160, as described above, is then used to align contact tails 114 to contact pads 132. Alignment tool 140 includes an inclined region 146 between blade portion 144 and upper portion 148. Inclined region 146 ensures that fixture block 160 does not obscure the operator's view of the contact pads 132 and tails 114 during the alignment operation or soldering operation.

Once alignment is completed, alignment tool 140 is moved down and away from connector 110. This motion positions tails 114 on contact pads 132 and releases tabs 120 from alignment tool 140. Alignment tool 140 is then moved up and out of the way. The board is then ready for the contact tails 114 to be soldered to the contact pads.

Having described one embodiment, numerous alternative embodiments or variations might be made. For example, it is not necessary that a metal tie bar be used. A plastic tie bar could also be used.

A specific method of holding and positioning alignment tool 140 was described. Many alternative methods are possible. If an alternative positioning method is used, the sequence of motions in the alignment operation could change, but the end result of aligning the tails to the contact pads would be the same.

The figures illustrate that connector 110 has a single set of contact tails 114 which are soldered to the upper surface of printed circuit board 130. In general, printed circuit boards have contact pads on two surfaces Connector 110 might have a second set of contact tails engaging the lower surface of the board. In that case, once the contact tails are aligned with contact pads on one surface, board 130 could be flipped to align a second set of contact tails with the contact pads on the lower surface.

Also, a single way for the tie bar to engage the alignment tool was illustrated. Many other engagement mechanisms are possible. For example, holes 142 could be cut in the tie bar and the tabs could be formed in alignment tool 140.

As another variation, it was described that the alignment tool is removed after alignment of leads and contact pads. The tool could be keep in place to maintain the alignment during soldering, if desired.

Therefore, the invention should be limited only by the spirit and scope of the appended claims.

What is claimed is:

1. A method of manufacturing a printed circuit board with a plurality of contact pads on a surface thereof, the method comprising the steps of:

a) providing an electrical connector having a plurality of contact tails joined by a tie bar, the tie bar having tabs extending therefrom;

b) providing an alignment tool having a lower edge with openings along the lower edge;

c) engaging the openings of the alignment tool to the tabs of the tie bar;

d) moving the alignment tool to align the contact tails to the contact pads on the surface of the printed circuit board;

e) attaching the contact tails to the contact pads.

2. The method of claim 1 wherein the step of providing an alignment tool comprises providing an alignment tool with openings along the lower edge wherein the openings have at least one tapered edge.

3. The method of claim 1 wherein the step of providing an electrical connector with a tie bar and tabs extending therefrom comprises providing an electrical connector with a tie bar and hook shaped tabs extending therefrom.

4. The method of claim 1 wherein the step of providing an alignment tool comprises providing an alignment tool with a blade, wherein the lower edge is along the lower edge of the blade.

5. The method of claim 1 wherein the step of providing an electrical connector with a tie bar comprises providing an electrical connector with a metal tie bar.

6. The method of claim 1 wherein the step of moving the alignment tool comprises sliding the tool along a shaft.

7. The method of claim 5 wherein the step of providing an electrical connector with a tie bar and tabs extending therefrom comprises providing an electrical connector with a tie bar and hook shaped tabs extending therefrom.

8. The method of claim 1 additionally comprising the step of removing the tie bar.

9. The method of claim 1 wherein the step of moving the alignment tool comprises visually observing the contact pads on the printed circuit board while moving the alignment tool.

* * * * *